United States Patent [19]

Casanova

[11] Patent Number: 4,684,838
[45] Date of Patent: Aug. 4, 1987

[54] ELECTRIC MOTOR WITH DEFORMABLE DISK BRAKE

[75] Inventor: Damien Casanova, Barcelona, Spain

[73] Assignee: Mavilor Systemes S.A., Coppet, Switzerland

[21] Appl. No.: 886,187

[22] Filed: Jul. 16, 1986

[30] Foreign Application Priority Data

Jul. 26, 1985 [CH] Switzerland .................. 3257/85

[51] Int. Cl.4 ................ B60T 13/74; H02K 7/102
[52] U.S. Cl. .................... 310/93; 188/71.1; 188/171
[58] Field of Search .............. 188/71.1, 161, 163, 188/171, 173; 310/77, 93, 123, 76, 78

[56] References Cited

U.S. PATENT DOCUMENTS

| 2,911,548 | 11/1959 | Joy et al. ........................ 310/77 |
| 3,665,231 | 5/1972 | Wendler .......................... 310/77 |
| 3,826,342 | 7/1974 | Noly ............................... 188/171 |
| 4,096,404 | 6/1978 | Sukhanov et al. ............... 310/77 |

FOREIGN PATENT DOCUMENTS 287363  3/1953  Fed. Rep. of Germany ........ 310/77

Primary Examiner—Patrick R. Salce
Assistant Examiner—D. L. Rebsch
Attorney, Agent, or Firm—Kane, Dalsimer, Kane, Sullivan and Kurucz

[57] ABSTRACT

An electric motor has a disk brake which is designed as an electromagnetically operated spring-loaded brake, acts as a standstill brake and has a thin, elastically flexible brake disk (12) of spring steel. This brake disk (12) is immovably fixed on the motor shaft (2) between an axially movable, rotationally fixed armature (8) of the electromagnet and a stationary brake part (13) which forms the outer brake housing. The annular stator (4) of the electromagnet surrounds the motor shaft, with formation of a free annular space which offers room for further attaching parts, for example a tachometer generator and/or a phase-angle sensor, or else for a ball bearing carrying the shaft. Borne axially displaceably in the stator (4) is a coil (6) which, in the braking state, is pressed by compression springs (7) against the armature (8), which for its part presses an annular rim zone (12a) of the brake disk (12), with elastic deformation of the same, against the stationary brake part (13). When the coil (6) is excited, the stronger magnetic force pulls the armature (8) back from the brake disk (12). The thin brake disk (12) is characterized by a small moment of inertia, owing to its low weight.

7 Claims, 2 Drawing Figures

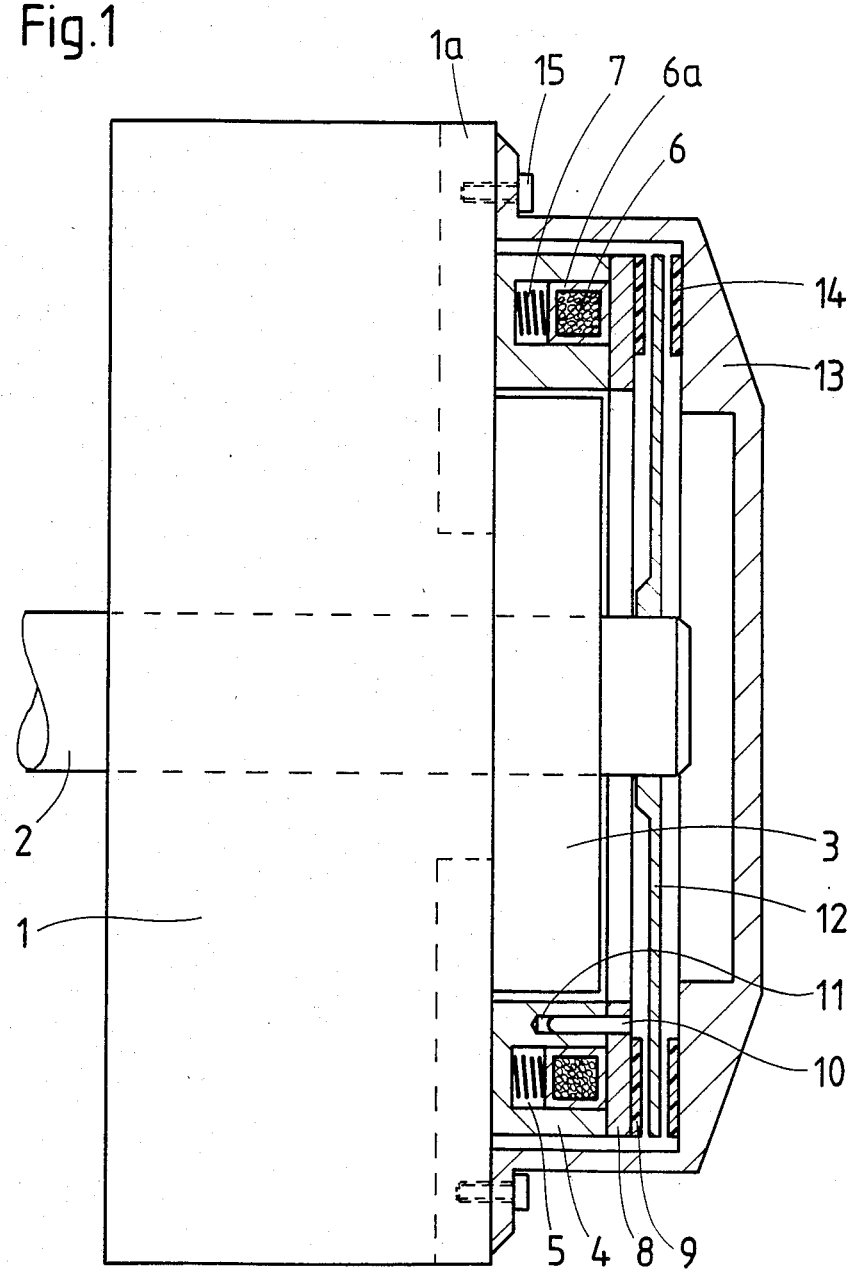

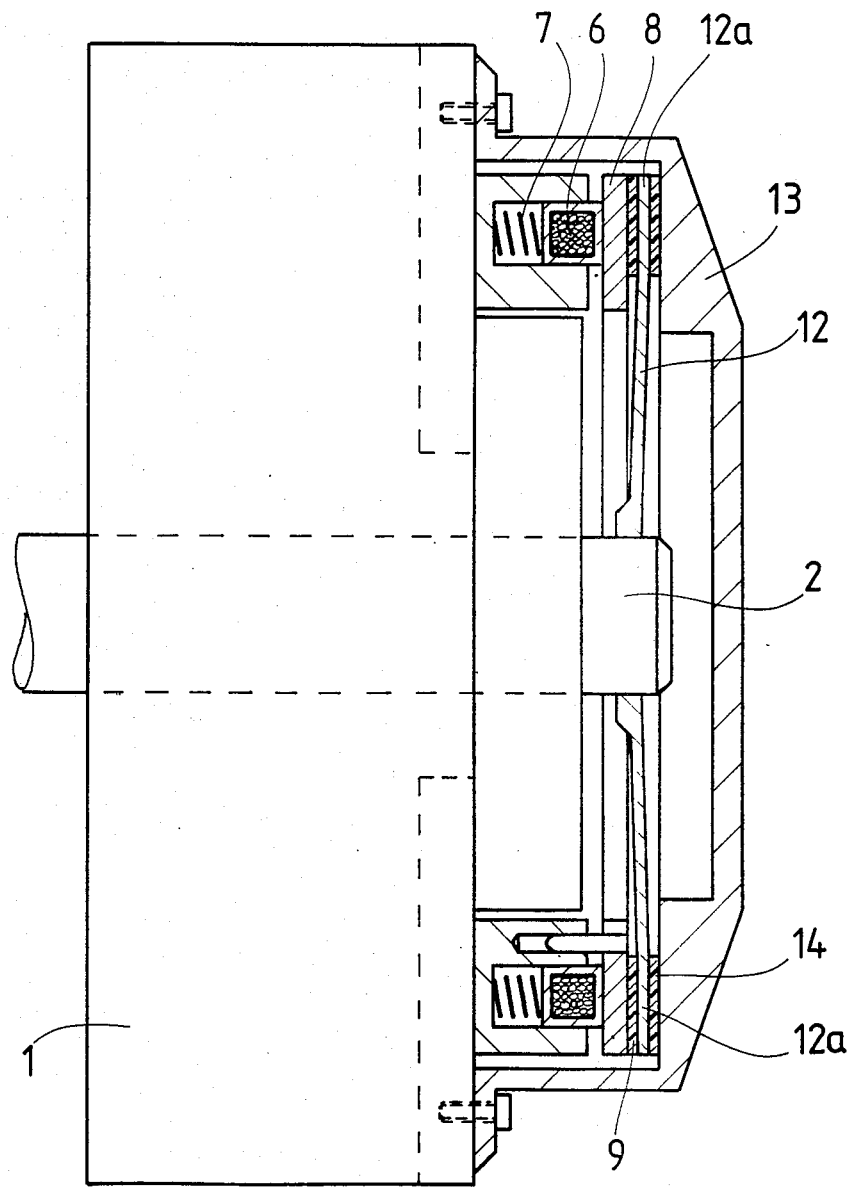

ELECTRIC MOTOR WITH DEFORMABLE DISK BRAKE

FIELD OF THE INVENTION

The invention relates to an electric motor with disk brake, with a brake disk immovably secured on the motor shaft, with an annular pressing part opposite the brake disk on one side, which concentrically surrounds the shaft and is arranged rotationally fixed but axially movable, with a device for generation of the braking force, by which the pressing part is pressed against the brake disk, and with a device for easing of the brake, by which the pressing part is moved away from the brake disk, the devices for generation of the braking force and for easing of the brake being accommodated in an annular housing frame.

PRIOR ART

Such a disk brake intended for a motor is known, for example, from European patent application EP No. 0,078,944 and is designed as an electromagnetically operated spring-loaded brake. The brake disk consists in this case, as in the case of numerous other known disk brakes as well, of a rigid, quite heavy and thick disk, to which a brake lining is secured, and is impinged on one side by the pressing part during the braking operation. The pressing part is formed by the armature of an electromagnet, the pot-shaped magnet housing of which concentrically surrounds the motor shaft and carries an axially toroidal coil. The toroidal coil is pressed by springs in the direction of the armature, which is arranged axially movably between a coil and brake disk. The bearing bush for the motor shaft is seated in the central opening of the magnet housing, which therefore surrounds the motor shaft at only a small distance.

Disk brakes of this type are used in particular as standstill brakes, which assume their braking position when the coil is currentless, in other words when the motor is disconnected, by the armature's being pressed against the brake disk by the springs, by means of the displaceable coil. With excitation of the coil, on the other hand, the brake is eased by the stronger magnetic force, pulling the armature back from the brake disk against the action of the springs. Such standstill brakes are necessary in particular on positioning motors, the rotor of which has to be blocked in its position if the motor is disconnected or there is a power failure.

Owing to their relatively large weight and therefore large moment of inertia, the rigid, heavy brake disks used up until now are frequently unfavorable, namely when they are used as standstill brakes for positioning motors which have to be switched on and off frequently, and in particular have to be accelerated and braked rapidly. If the motor has to operate at high speeds as well, a large moment of inertia of the brake disk is especially unfavorable. In addition, the necessary perfect balancing of the heavy brake disk is laborious and time-consuming. Furthermore, the space requirement necessary for accomodation of the brake is frequently inconvenient, above all if the motor has to be equipped with further attaching parts, for example a tachometer generator and/or a phase-angle sensor.

SUMMARY OF THE INVENTION

The invention has the objective of creating an electric motor with a disk brake, the brake disk of which has an only small moment of inertia, without the braking performance's being impaired thereby, and which is accommodated in such a space-saving way that it does not disturb the installation of attaching parts and, in particular, allows a compact design without great space requirement in the axial direction. Such a brake is advantageous, in particular as a standstill brake for positioning motors.

In this way, the brake disk, which is firmly clamped between pressing part and stationary brake part during braking, can be designed to be especially thin, whereby its weight and its moment of inertia can be kept very small and its balancing is facilitated. These advantages are enhanced further by the brake lining's preferably being arranged on the pressing part and on the stationary brake part, but not on the brake disk. As the braking force becomes effective through the annular pressing part on the outer rim of the brake disk, a maximum braking moment is obtained. Furthermore, there is the advantage that the free annular space within the housing frame of the brake is available in a space-saving way for the accomodation of a further attaching part, in particular of a tachometer generator and/or a phase-angle sensor, or else of a ball bearing for the motor shaft.

Preferably, the brake disk is designed in the form of an electromagnetically operable spring-loaded brake, in particular a standstill brake, the housing frame forming the stator of the electromagnet and carrying, in a way known per se, at least one coil which is borne axially movably in a recess of the stator and is supported, under the effect of a spring, by its outer face against the pressing part forming the armature of the electromagnet; in this arrangement, when the coil is disconnected, the pressing part assumes its braking position under the effect of the spring and, when the coil is excited, assumes its easing position due to the oppositely acting, stronger magnetic force.

The invention will be described in more detail with reference to the drawings by describing an exemplary embodiment of an electric motor with an electromagnetically operable spring-loaded brake, which acts as standstill brake.

BRIEF DESCRIPTION OF THE DRAWINGS

FIG. 1 shows a side view of the motor with an axial cross-section through the brake in released state and FIG. 2 shows the same axial cross-section in the braked state.

DESCRIPTION OF THE PREFERRED EMBODIMENT(S)

The disk brake is mounted on the side of a flange 1a of an electric motor 1 (indicated only diagrammatically) and consists of an electromagnet concentrically surrounding the shaft 2 of the motor 1 at a distance and with an armature 8, which forms the pressing part, a brake disk 12, which is immovably secured on the shaft 2 by a press fit, and a stationary brake part 13 forming the outer brake housing.

The electromagnet has an annular housing frame 4 which forms the stator, is secured on the motor flange 1a and is pot-shaped, the annular recess 5 on the side facing away from the motor 1 being open. An annular coil 6 with its coil element 6a is borne axially displaceable in the recess 5 and is subject to the effect of springs 7 in the form of helical springs. These are compression springs, which lie in the recess 5, distributed evenly along the periphery of the stator 4, and are supported on the one hand against the bottom of this recess 5 and on the other hand against the inside of the coil element 6a of the coil 6. Borne rotatably fixed, but axially displaceable between the stator 4 with its coil 6 and the brake disk 12, is the annular armature 8, which forms the pressing part and surrounds the shaft 2 at a distance. To prevent a rotation of the armature 8, a number of axially directed pins 10 are secured on it, distributed around its periphery, which pins engage freely displaceably in corresponding openings 11 of the stator 4. The stationary brake part 13, which forms a brake housing covering the brake with its electromagnet, is secured by means of screws 15 on the motor flange 1a.

On their sides facing the brake disk 12, the armature 8 and the stationary brake part 13 carry annular brake linings 9 and 14, which are opposite an annular rim zone 12a of the brake disk 12. The brake disk 12 consists of elastically flexible spring steel and has a thickness of only, for example, 0.15 to 0.30 mm, preferably of about 0.20 mm. Its diameter is matched to the motor size and, in the example considered, is approximately 16 cm. Up to an outside diameter of about 20 cm, the brake disk 12 may have the preferred thickness mentioned of about 0.2 mm; at diameters of 20 cm to 30 cm and above, this thickness may be chosen correspondingly greater and be, for example, approximately 0.3 mm.

The air gaps between the brake disk 12 and the brake lining 8 of the armature 9, on the one hand, and the brake lining 14 of the brake part 13, on the other hand, are, in the eased state, in each case about 0.2 mm, so that the border zone 12a of the brake disk 12 is displaced by about 0.2 mm during braking.

With regard to the thickness of the brake disk 12 and the air gaps mentioned, which have been shown as exaggeratedly large in FIGS. 1 and 2 for reasons of clarity of the representation, FIGS. 1 and 2 are not true to scale.

The free annular space limited by the stator 4 of the electromagnet is relatively large as, after all, the diameter of the annular stator 4 may be chosen only a little smaller than the diameter of the electric motor, and its radial dimension relatively small. Therefore, this inner annular space, the diameter of which is preferably at least as large as half the motor diameter, may be utilized for accommodation of a further attaching part 3 installed on the motor flange 1a, for example a tachometer generator and/or a phase-angle sensor, whereby an especially space-saving, compact design is achieved. However, in this annular space may also be mounted a bearing, in particular a ball bearing, arranged outside the flange 1a, for the shaft 2 of the motor 1, whereby the axial distance between the two bearings carrying the shaft 2 is increased and thus the stability of the motor rotor is improved.

FIG. 1 shows the disk brake in the eased state, which it assumes when the motor is switched on and thus the coil 6 is excited. In this state, the magnetic force, which overcomes the force of the springs 7, pulls the armature 8 back as far as the stop on the stator 4, the axially movable coil 6 being pressed into the recess 5 by its coil element 6a against the effect of the springs 7, and the brake disk 12 being released. In this unimpinged and undeformed state, the brake disk 12 is at an axial distance both from the brake lining 9 on the armature 8 and from the brake lining 14 on the inside of the stationary brake part 13 and can turn freely with the shaft 2.

FIG. 2 shows the braking state of the brake, which it assumes when the motor is disconnected or the power fails and thus the coil 6 is currentless. In this state, the springs 7 press the coil 6 by its coil element 6a axially outward against the armature 8, which presses the annular rim zone 12a of the brake disk 12, with elastic deformation of this brake disk, against the stationary brake part 13, whereby the brake disk is thus clamped by its rim zone 12a firmly between the two brake linings 9 and 14. Owing to this two-sided impingement of the brake disk 12 and the circumstance that the braking force acts on the outer rim of the brake disk 12, a maximum braking moment is achieved. As soon as the brake disk is released upon easing of the brake, it resumes its undeformed shape, shown in FIG. 1, owing to its natural elasticity.

Owing to its only small moment of inertia, its acceleration and its braking do not require any substantial additional motor forces, so that the disk brake according to the invention is suitable in particular for positioning motors switched on and off frequently. As it is seated axially immovably on the shaft 2, a clearance-free blocking of the motor shaft at a standstill is also guaranteed.

The invention is not restricted to the embodiment described, but, in view of its structural design, permits manifold variants; in particular, instead of an annular coil 6, several separate coils evenly distributed along the periphery of the stator 4 may be provided, for example three coils.

Furthermore, the braking force and/or the force for easing of the brake may be generated in a different way than by springs or by electromagnetic forces, for example by pressure-medium-operated cylinder-piston units. In this case, in the recesses 5 of the housing frame 4, for example, instead of the springs and coils, pneumatically or hydraulically operated, double-acting pistons are accommodated, which act on a pressing part corresponding to the armature 8 and are, for example, hinged to it.

I claim:

1. An electric motor with disk brake, consisting of a brake disk (12) immovably secured on the motor shaft (2), an annular pressing part (8) opposite the brake disk (12) on one side, which concentrically surrounds the shaft (2) and is arranged rotationally fixed but axially movable, a device for generation of the braking force, by which the pressing part (8) is pressed against the brake disk (12), and a device for easing of the brake, by which the pressing part (8) is moved away from the brake disk (12), the devices for generation of the braking force and for easing of the brake being accommodated in an annular housing frame (4), wherein the annular housing frame (4) and the pressing part (8) surround the shaft (2) of the motor (1), with formation of a free annular space, which offers room for a further attaching part (3), in particular a tachometer generator and/or a phase-angle sensor, or for a bearing, in particular a ball bearing, carrying the motor shaft (2), wherein the brake disk (12) consists of an elastically flexible material, wherein a stationary brake part (13) is fitted on the side of the brake disk (12) facing away from the pressing part (8), and wherein the pressing part (8), under the effect of the braking force, presses an annular rim zone (12a) of the brake disk (12), with elastic deformation of the same, against the stationary brake part (13).

2. An electric motor with attached disk brake as claimed in claim 1, wherein the brake disk (12) consists of spring steel and has a thickness between 0.15 and 0.30 mm, preferably of 0.20 mm, and an outside diameter between 0.16 and 0.30 cm.

3. An electric motor with attached disk brake disk as claimed in claim 1, wherein a brake lining (9, 14) is secured on the pressing part (8) and/or on the stationary brake part (13), but not on the brake disk (12).

4. An electric motor with attached disk brake as claimed in claim 1, in the form of a spring-loaded brake operable by an electromagnet, wherein the housing frame (4) forms the stator of the electromagnet and carrying, in a way known per se, at least one coil (6) which is borne axially movably in a recess (5) of the stator and is supported, under the effect of a spring (7), by its outer face against the pressing part (8) forming the armature of the electromagnet, which pressing part assumes its braking position under the effect of the spring (7) when the coil is disconnected and assumes its easing position due to the oppositely acting stronger magnetic force when the coil (6) is excited.

5. An electric motor with attached disk brake as claimed in claim 4, wherein the electromagnet has several separate coils (6) distributed along the periphery of the stator (4).

6. An electric motor with attached disk brake as claimed in claim 4, wherein the stationary brake part (13) is formed by a pot-shaped housing part covering the brake disk (12) and the electromagnet.

7. An electric motor with attached disk brake as claimed in claim 1, wherein the diameter of the free annular space is at least as large as half the diameter of the electric motor.

* * * * *